United States Patent
Caliman et al.

(10) Patent No.: US 10,042,951 B2
(45) Date of Patent: *Aug. 7, 2018

(54) CONTEXTUAL COMMENTING ON THE WEB

(71) Applicant: Adobe Systems Incorporated, San Jose, CA (US)

(72) Inventors: Razvan Caliman, Piatra Neamt (RO); Paul-Alexandru Chirita, Bucharest (RO)

(73) Assignee: Adobe Systems Incorporated, San Jose, CA (US)

(*) Notice: Subject to any disclaimer, the term of this patent is extended or adjusted under 35 U.S.C. 154(b) by 213 days.

This patent is subject to a terminal disclaimer.

(21) Appl. No.: 14/825,871

(22) Filed: Aug. 13, 2015

(65) Prior Publication Data

US 2015/0347619 A1    Dec. 3, 2015

Related U.S. Application Data

(62) Division of application No. 13/253,409, filed on Oct. 5, 2011, now Pat. No. 9,141,595.

(51) Int. Cl.
*G06F 17/22* (2006.01)
*G06F 17/30* (2006.01)
*G06F 17/24* (2006.01)

(52) U.S. Cl.
CPC .... *G06F 17/30905* (2013.01); *G06F 17/2247* (2013.01); *G06F 17/241* (2013.01); *G06F 17/30864* (2013.01); *G06F 17/30896* (2013.01)

(58) Field of Classification Search
CPC .. G06F 17/30864; G06F 17/241; G06F 17/24; G06F 17/2247; G06F 17/30905; G06F 17/30896
See application file for complete search history.

(56) References Cited

U.S. PATENT DOCUMENTS

| 5,598,311 | A  * | 1/1997 | Yang ............... H01H 33/596 361/13 |
| 6,438,564 | B1 | 8/2002 | Morton et al. |
| 7,370,285 | B1 | 5/2008 | Nickerson et al. |
| 7,409,633 | B2 | 8/2008 | Lemer et al. |
| 7,555,476 | B2 | 6/2009 | Holbrook |
| 7,676,505 | B2 | 3/2010 | Chess et al. |
| 7,895,598 | B2 * | 2/2011 | Eide ................. G06F 17/227 707/705 |

(Continued)

OTHER PUBLICATIONS

Final Office Action for U.S. Appl. No. 13/253,409 dated Jun. 2, 2014, 13 pages.

(Continued)

*Primary Examiner* — Maikhanh Nguyen
(74) *Attorney, Agent, or Firm* — Kilpatrick Townsend & Stockton LLP

(57) ABSTRACT

Techniques for contextual commenting on the web are disclosed. In some embodiments, contextual commenting on the web includes receiving a content selection for a comment within a corpus of content; determining a contextual based location within the corpus of content to map the contextual comment to a subset of content with the corpus of content; and storing the comment and the contextual based location within the corpus of content for the comment.

20 Claims, 14 Drawing Sheets

(56) References Cited

U.S. PATENT DOCUMENTS

| | | | |
|---|---|---|---|
| 8,326,684 B1 | 12/2012 | Halahmi et al. | |
| 8,612,297 B2 | 12/2013 | Levy et al. | |
| 8,655,944 B2* | 2/2014 | Silbey | G06F 8/65 709/203 |
| 8,683,789 B2* | 4/2014 | Willats | F02D 9/04 123/90.15 |
| 8,745,067 B2* | 6/2014 | Cierniak | G06F 17/30864 707/749 |
| 9,176,943 B2* | 11/2015 | Shaver | G06F 17/241 |
| 2004/0041843 A1* | 3/2004 | Cui | G06F 17/241 715/810 |
| 2004/0049534 A1 | 3/2004 | Nickerson et al. | |
| 2004/0143796 A1 | 7/2004 | Lerner et al. | |
| 2006/0161535 A1 | 7/2006 | Holbrook | |
| 2007/0061710 A1* | 3/2007 | Chartier | G06F 17/227 715/234 |
| 2007/0185927 A1 | 8/2007 | Chess et al. | |
| 2007/0255702 A1 | 11/2007 | Orme | |
| 2008/0209361 A1* | 8/2008 | Nickerson | G06F 17/3089 715/808 |
| 2008/0281610 A1 | 11/2008 | Yoshida et al. | |
| 2009/0204882 A1 | 8/2009 | Hollander et al. | |
| 2009/0248494 A1 | 10/2009 | Hueter et al. | |
| 2010/0063879 A1 | 3/2010 | Araradian et al. | |
| 2010/0162093 A1 | 6/2010 | Cierniak | |
| 2010/0241507 A1 | 9/2010 | Quinn et al. | |
| 2010/0241968 A1 | 9/2010 | Tarara et al. | |
| 2010/0262518 A1 | 10/2010 | Hillis et al. | |
| 2010/0299317 A1 | 11/2010 | Uy et al. | |
| 2011/0040787 A1* | 2/2011 | Cierniak | G06F 17/30864 707/770 |
| 2011/0082848 A1 | 4/2011 | Goldentouch | |
| 2011/0099467 A1* | 4/2011 | Kapur | H04L 67/02 715/236 |
| 2011/0145698 A1* | 6/2011 | Penov | G06F 17/272 715/235 |
| 2011/0153388 A1 | 6/2011 | Vuong et al. | |
| 2012/0084155 A1 | 4/2012 | Roy et al. | |
| 2012/0084345 A1* | 4/2012 | Silbey | G06F 8/65 709/203 |
| 2013/0091419 A1 | 4/2013 | Caliman et al. | |
| 2014/0032633 A1* | 1/2014 | Kleppner | G06F 17/241 709/202 |
| 2014/0033013 A1* | 1/2014 | Shaver | G06F 17/24 715/230 |

OTHER PUBLICATIONS

Non-Final Office Action for U.S. Appl. No. 13/253,409 dated Oct. 24, 2014, 13 pages.

Non-Final Office Action for U.S. Appl. No. 13/253,409 dated Feb. 19, 2013, 21 pages.

Notice of Allowance for U.S. Appl. No. 13/253,409 dated Jun. 17, 2015, 15 pages.

Author Unknown, Boffter.com Stumbled on a Webpage?, Aug. 8, 2011.

Author Unknown, LineBuzz.com Inline Blog Comments-Beta, Aug. 8, 2011.

Luz, Y-Notes: Unobtrusive Devices for Hypermedia Annotation, 2001.

Miettinen et al., EDUCOSM—Personalized Writable Web for Learning Communities, 2003.

Vasudevan et al., On Web Annotations: Promises and Pitfalls of Current Web Infrastructure, 1999.

Author Unknown, Selectmeme.com the Highlights, Open Feedback Dialog, Aug. 8, 2011.

Neil Bates, flumotion.com/blog/fulmotion-contextual-commenting, Flumotion Contextual Commenting, May 12, 2010.

\* cited by examiner

CONTEXTUAL COMMENTING ON THE WEB

CROSS-REFERENCE TO RELATED APPLICATION

This application is a divisional application of U.S. patent application Ser. No. 13/253,409 filed Oct. 5, 2011, the entire contents of which are incorporated herein by reference for all purposes.

BACKGROUND

Desktop content editing applications, such as Adobe® Acrobat® and Microsoft® Word, include functionality for allowing users to insert comments by marking a specified selection of content and applying a comment to it.

BRIEF DESCRIPTION OF THE DRAWINGS

Various embodiments of the invention are disclosed in the following detailed description and the accompanying drawings.

DETAILED DESCRIPTION

Figure 1:
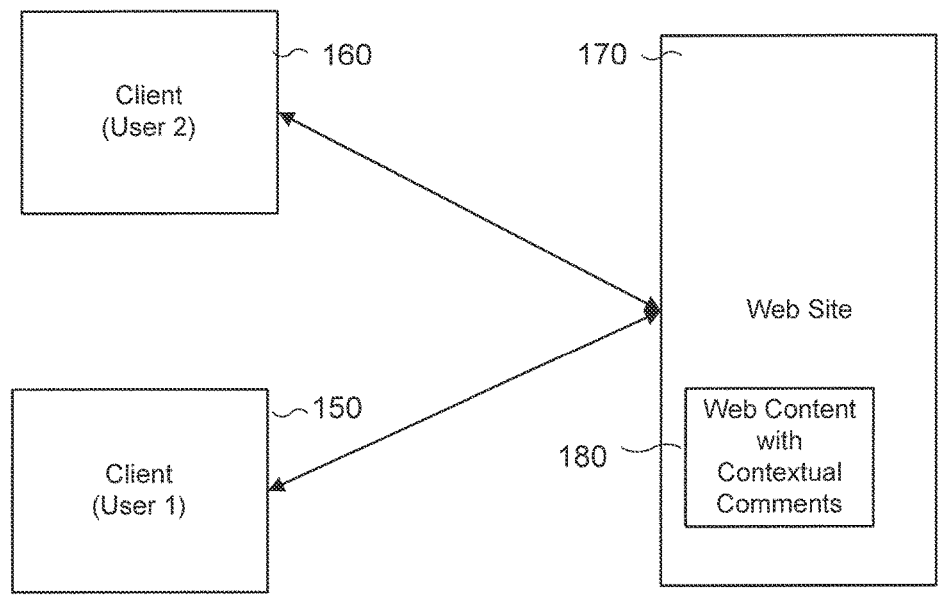
FIG. 1 is a network architecture diagram for providing contextual commenting on the web in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Desktop content editing applications, such as Adobe® Acrobat® and Microsoft® Word, include functionality for allowing users to insert comments by marking a specified selection of content and applying a comment to it.

What is needed are techniques for providing contextual commenting for web content, such as articles, web pages, blogs, and/or other content available online, such as via the World Wide Web (e.g., web). For example, web content can change (e.g., as a result of dynamic content, such as dynamic script content, advertisements, and/or modifications or updates to the web content by a web author), and, thus, techniques for efficiently and effectively maintaining contextual comments in association with the relevant subset of the web content (e.g., content selection for the comments) is needed.

Accordingly, techniques for contextual commenting on the web are disclosed. In some embodiments, contextual commenting on the web includes receiving a content selection for a comment within a corpus of content; determining a contextual based location within the corpus of content to map the contextual comment to the content selection; and storing the comment and the contextual based location within the corpus of content for the comment. In some embodiments, contextual commenting on the web further includes determining contextual comment location based on a CSS selector to map the contextual comment to the content selection; and updating the CSS selectors (e.g., if the web content has been modified); and storing the updated version of the CSS selector. In some embodiments, contextual commenting on the web further includes receiving a plurality of rankings on the comment; and determining a popularity ranking of the comment based on the received rankings.

In some embodiments, contextual commenting on the web includes sending a request for a web page to a web server; receiving the web page from the web server; receiving contextual comments associated with the web page from the web server; receiving executable code from the web server for mapping the contextual comments to selected content of the web page; and displaying the web page indicating the contextual comments shown as associated with the selected content.

In some embodiments, contextual commenting provides a fluent workflow that provides for a classic list of comments (e.g., listed at the bottom of each web page) as well as contextually associated and displayed comments within the web content. For example, links can be attached to the comments in a classic list and point to the context within the page that relate to the comments.

In some embodiments, contextual commenting on the web also includes techniques for monitoring and dynamically updating a display of the contextual comments based on peer or community input, such as to determine comment relevancy and/or priority for display. For example, by using a rating and threaded commenting approach, contextual commenting can effectively indicate hot-spots of interest in web content and highlight them accordingly.

In some embodiments, as a mechanism to filter-out noise, techniques are provided herein to vary the prominence of user contributions based on various user inputs, such as voting input and/or rankings. For example, using this approach, community-approved content can be more prominently displayed, and ousted comments can still be available but displayed in a secondary or less prominent manner. Accordingly, the various techniques described herein can assist comment moderators by factoring-in the natural reaction of the self-regulating community, which can identify less relevant or improper contributions (e.g., outdated input, incorrect input, irrelevant input, and/or offensive or inappropriate input). Providing such comments in a meaningful and contextual display also provides a more compelling approach for users, rather than a traditional list of comments that is not prioritized or presented in a manner that is contextually linked or dynamically updated and presented based on community feedback.

Various techniques described herein can be applied to web content, such as articles posted on the web (e.g., World Wide Web), blog sites/content available on the web, product documentation available on the web (e.g., online help and online community help resources), and/or other forms of content available online. For example, these techniques can be applied to a wide range of community and multi-user applications. For instance, in the dynamic online social environment, user-to-user knowledge exchange can be very important, and users can obtain information from online articles as well as from peers who provide feedback and input to such articles. However, often due to the sheer volume of user contributions, some essential information can become muted by other, less relevant feedback, hidden in vast lists of comments.

Accordingly, using the techniques described herein that provide for pairing a valuable comment in context with the associated content selection, users can obtain a more streamlined information flow while reading such web content. As another example, this approach can promote contextual help, annotations, and corrections in web content in a dynamic online social environment. In some embodiments, techniques are provided for supporting social interaction patterns, such as voting on and replying to contextual comments, to provide an online document as a vibrant source of user-to-user information exchange.

FIG. 1 is a network architecture diagram for providing contextual commenting on the web in accordance with some embodiments. As shown, a client device 150 and a client device 160 (e.g., client devices can be any computing device, such as a laptop, tablet computer, smart phone, desktop computer, or any other type or form of computing device) are in communication with a web site 170 (e.g., a web server or appliance, application server or appliance, or other computing platform that can facilitate delivery of web content). The web site 170 stores web content with contextual comments 180. A first user can use client device 150 to access the web site 170 to view the web content with contextual comments 180. For example, the first user can view the contextual comments, add new contextual comments, and/or provide feedback regarding existing contextual comments using the techniques described herein. Similarly, a second user can use client device 160 to access the web site 170 to view the web content with contextual comments 180, and the second user can view the contextual comments, add new contextual comments, and/or provide feedback regarding existing contextual comments (e.g., posted by the first user) using the techniques described herein.

In particular, web content can change or be modified. For example, advertiser widgets can insert content based on text in the web content and/or advertising links or other scripts on a web page can affect the web content (e.g., scripts and/or plug-ins can allow users to click on an image or title or other content on the page to display new content). As a result, techniques are needed to ensure that the contextual commenting widget can support changing web content.

In some embodiments, the contextual commenting widget automatically adapts to changing web content, such as web content that undergoes layout structure changes. For example, the contextual commenting widget can adaptively associate comments to selected content without requiring a strict dependency to the hierarchical markup structure of the web content.

In contrast, approaches that solely rely on XPATH to decode and store a selection's location on a web page (e.g., in which an XPATH address is stored remotely and then resolved on the web page on subsequent web page loads as the XPATH points to the node containing a text selection) can fail to adapt to changing web page content in which the layout structure changes. In an XPATH structure, the type and position of each node in the structure is required to resolving the address of the targeted node. As shown in the below HTML markup to reference example, an XPATH representation to the highlighted "article" node in this HTML markup would be /div[@id="content"]/div/p[1].

```
<div id="content">
<div class="wrapper">
<h2>Heading</h2>
<p>text</p>
<p class="article">
targeted text
</p>
</div>
</div>
```

If the web content changes such that another wrapper node is introduced in the hierarchy, then the XPATH address is likely to be corrupted. For example, it is common in publishing systems to change templates (e.g., layout structures) from time to time. As a result, the content would not change, but the presentation layer would change. Altering the node structure is then likely to orphan such XPATH addresses that are stored remotely as they would not properly resolve. For example, inserting an additional wrapper node into the HTML structure will break the previously noted XPATH representation as shown in the below example by the "innerWrapper" node.

```
<div id="content">
<div class="wrapper">
<div class="innerWrapper">
<h2>Heading</h2>
<p>text</p>
<p class="article">
targeted text
</p>
</div>
</div>
</div>
```

Accordingly, new adaptive and flexible techniques are provided so that the contextual commenting widget can automatically adapt to changing web content, such as web content that undergoes layout structure changes. In some embodiments, the contextual commenting widget is based on CSS (Cascading Style Sheet) selectors coupled with regular expressions.

For example, CSS selectors can be used in web development to target nodes when applying visual styles. CSS selectors provide for a permissive and flexible mechanism in targeting complex structures. Also, a CSS selector is not dependent on the exact hierarchical structure of the web content and, thus, is more flexible and adaptive to changing web content in which the underlying HTML structure of the web content is modified.

For example, given the same HTML markup as provided in the above examples, in both cases, the CSS selector to target the "article" node is as follows.
content.article In CSS selectors, a space between members signals a descendent hierarchical match, but not that it is necessarily directly descendent. In some embodiments, decoding the node hierarchy into a more complex CSS selector is provided to facilitate adaptive matching should the web content (e.g., HTML) structure change in the future (if nodes are inserted, changed, or deleted). Using this technique, the same CSS selector, written more specifically is equal in effect to the following:
div#content div.wrapper div.article In some embodiments, when storing a comment on a text selection, the full CSS selector is used as an address, in which, for example, the current page's URL and the text selection are stored on a remote machine through a web service. The CSS selector address for a contextual comment can then be used on a first load of a web page with that contextual comment. If the CSS selector fails to resolve, members are dropped starting at the end of the CSS selector and the query is reapplied. Web browsers support this functionality with the "querySelectorAll( )" JavaScript method. This process is performed recursively until the CSS selector is resolved to one of the targeted node's ancestor. Once this ancestor is determined, JavaScript is used to find its descendant nodes that contain the relevant text for the associated content selection. For example, with each text node found, the first five words can be matched from the text selection and stored remotely with the first five words in the current node. Regular expressions available in JavaScript can be used to perform this process. If a match is determined, then the starting node containing our selection has been identified. Next, the process can begin to start matching the last five words of the content selection with the last five words of the text node. If there is no match, the process continues looking through descendant nodes containing such text. This technique also supports the case in which the text selection spans multiple nodes. Once the end node for the text selection is identified, the contextual commenting widget can correctly apply a visual indicator (e.g., a highlighting, dashed underlining, and/or other visual indicator) and the user's comment to the content selection.

Accordingly, using these techniques, contextual commenting is provided that is flexible and adaptive to ever-changing layouts and designs of web content such that the context of a user's comment, if still present within the web content, can be adaptively recalled. In addition, once the new node structure is correctly parsed, an updated CSS selector matching can be stored for future reuse thereby avoiding costly node parsing and text matching for other users. Thus, an optimization is provided in which updating of CSS selectors for changing web content using techniques described herein is performed at a first client, and the updated CSS selectors are sent to the contextual commenting web platform (e.g., web site serving the web content with contextual comments) for server side storage of the updated contextual mapping. As a result, subsequent client requests can receive the updated CSS selectors and need not perform the updating CSS selector processing.

Figure 2A:
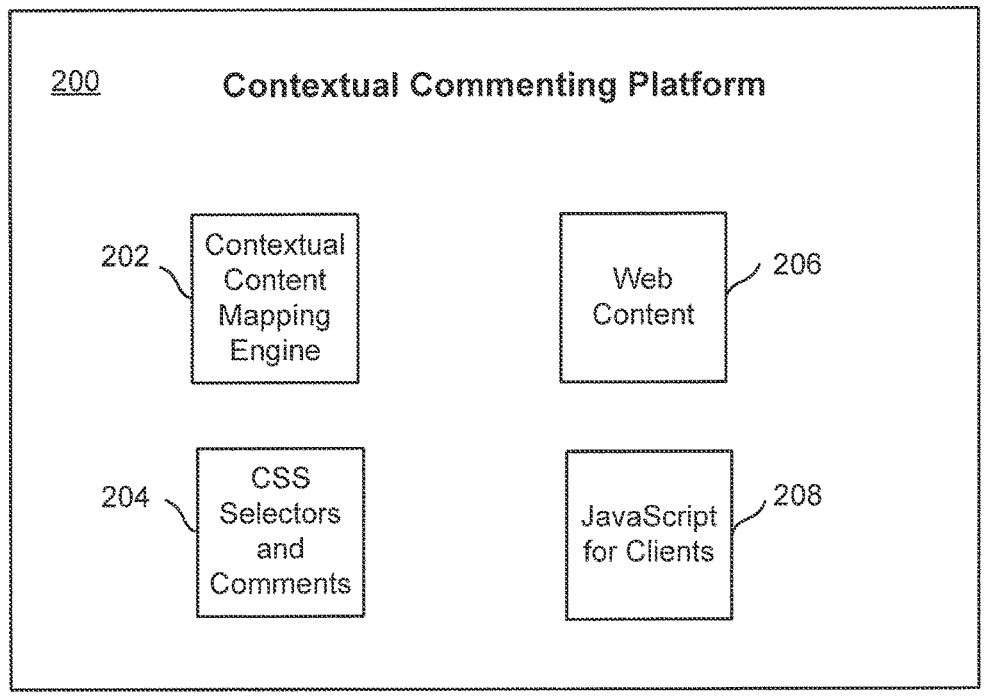
FIG. 2A is a functional block diagram of a logical server platform for providing contextual commenting on the web in accordance with some embodiments.

FIG. 2A is a functional block diagram of a logical server platform for providing contextual commenting on the web in accordance with some embodiments. As shown, contextual commenting platform 200 includes a contextual content mapping engine 202, CSS selectors and comments 204, content storage for web content 206, and JavaScript for clients 208. In some embodiments CSS selectors are used for determining a location within the web content for associating a contextual comment to a particular content selection for that comment, as further described herein. In some embodiments, JavaScript for clients 208 includes one or more JavaScript widgets that provide the client side executable functionality for providing contextual commenting interactions with web content, as further described herein. In some embodiments, contextual content mapping engine 202 performs an updating CSS selector process as described herein (e.g., for modified web content). In some embodiments, the updating CSS selector processor as described herein is performed by a client device as needed, and the client device sends the updated versions of CSS selector(s) to the contextual commenting platform, which stores the updated versions of the CSS selector(s).

Figure 2B:
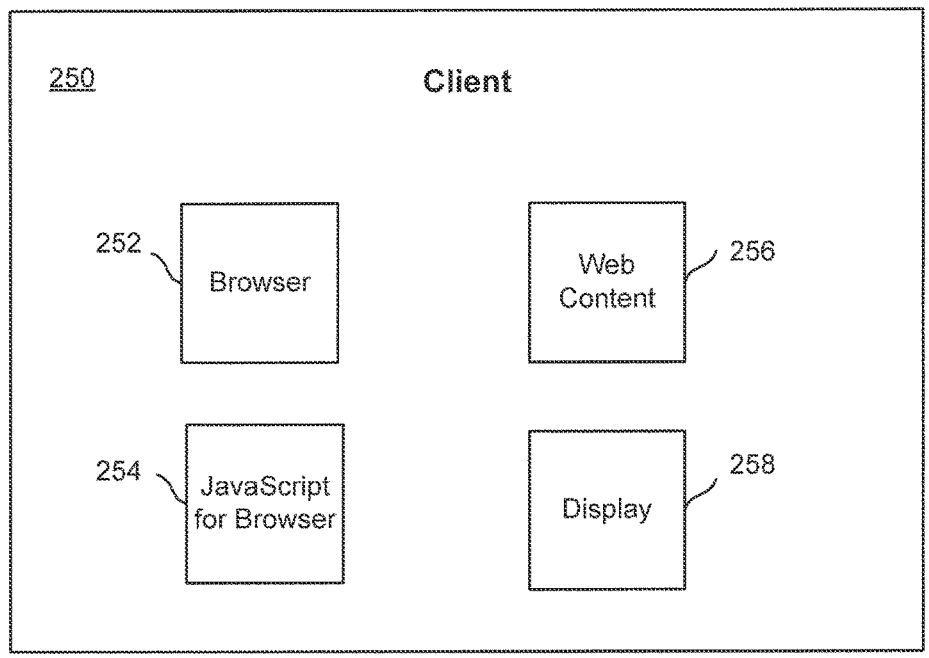
FIG. 2B is a functional block diagram of a client device for providing contextual commenting on the web in accordance with some embodiments.

FIG. 2B is a functional block diagram of a client device for providing contextual commenting on the web in accordance with some embodiments. As shown, client for contextual commenting 250 includes a web browser 252 (e.g., an HTML browser that supports CSS collectors as described herein, such Apple Safari®, Microsoft Internet Explorer®, Google Chrome®, Mozilla Firefox®, and/or another such web browser), JavaScript for the browser 254 (e.g., downloaded from the contextual commenting platform 200, which provides JavaScript for clients 208 for providing a contextual commenting widget, as further described herein), web content 256 (e.g., downloaded from the contextual commenting platform 200, which provides web content 206), and a display 258 for displaying the web content and associated contextual comments (if any).

In some embodiments, the various techniques described herein facilitate a contextual commenting platform and solution based on HTML, CSS (e.g., CSS selectors), and JavaScript. In some embodiments, an in-context commenting workflow is provided (e.g., combining contextual based commenting with social web techniques, including, for example, comment threading, voting and ranking) with an efficient implementation that supports contextual commenting for changing Web pages using CSS selectors.

In some embodiments, contextual commenting using JavaScript as a client-side technology is provided. For example, a JavaScript file can be linked from a host web page where contextual commenting can be enabled, in which the host web page is one on which its administrator allows for such contextual commenting. Using this approach, there is no need for additional add-ons or plug-ins for end-users (e.g., as most common web browsers support JavaScript, if users have JavaScript settings enabled on their client browser).

In some embodiments, users select a portion of downloaded web content (e.g., text, images, etc.) with their mouse, keyboard, touch screen, and/or other user interface input mechanism. In some embodiments, a contextual commenting widget is provided, which is associated with the downloaded web content and downloaded from the contextual commenting platform 200 to the client 250 along with the downloaded web content. For example, the contextual commenting widget can be implemented as a contextual commenting widget (e.g., implemented using a scripting language, such as JavaScript or another scripting language supported by a web browser). The JavaScript widget can attach custom behavior to the web content based on a JavaScript event. For example, this custom behavior can enable the user to comment on a content selection. Previous selections with comments made by other users can also be made visible on the web page by the executed/interpreted contextual commenting widget.

In some embodiments, the contextual commenting widget (e.g., implemented using a scripting language, such as JavaScript, which can be downloaded to extend web browser functionality for interacting with downloaded web content) includes a form to enter comments, in which a user is presented with an input method to enter a comment for the current selection.

In some embodiments, the contextual commenting widget includes the ability to reply to comments (e.g., threaded commenting), in which users are able to post feedback on comments other than their own. For example, this can provide for threaded commenting on content selections.

In some embodiments, the contextual commenting widget includes a method of highlighting sections which have comments, in which content selections that have attached comments will be highlighted differently from the other text on the page. Based on the activity on a selection, such as multiple comments, the highlight can differ in intensity (e.g., by color or illustration). For example, this can signal a piece of content of special interest on the page.

In some embodiments, the contextual commenting widget includes the ability to view all comments attached to a selection, in context, in which users will be able to click on the highlighted selection in order to see all the comments attached to it. For example, this can happen without requiring a user to leave the current context of the page.

In some embodiments, the contextual commenting widget includes a method for rating comments, in which users will be able to express approval or disapproval of comments by voting on them. For example, voting can be supported using a binary voting system (e.g., yes or no voting input, or agree or disagree input, and/or other input options) referring to their appreciation of the contextual comment.

In some embodiments, the contextual commenting widget includes a ranking algorithm for contextual comments, in which based on user ratings, the best comments will have greater prominence in a list of threaded comments. For example, this also means that highly negative rated comments can be excluded from the page.

In some embodiments, the contextual commenting widget further provides a classic list of comments, in which all comments posted on the page will be visible in a list on a separate area of the page. For example, the entries in this list can have links pointing to their appropriate context in the page.

In some embodiments, in-context comment moderation (e.g., approve/reject comments) is provided. In some embodiments, the contextual commenting widget includes functionality to identify privileged users (e.g., via a login based on login credentials and/or using various other identity verification related techniques), as well as to enable such privileged users (e.g., when logged in) to moderate contextual comments, for example, by approving, rejecting, and/or editing existing comments (e.g., in order to completely remove certain comments pursuant to editorial standards, legal standards, and/or other reasons/standards).

Figure 3:
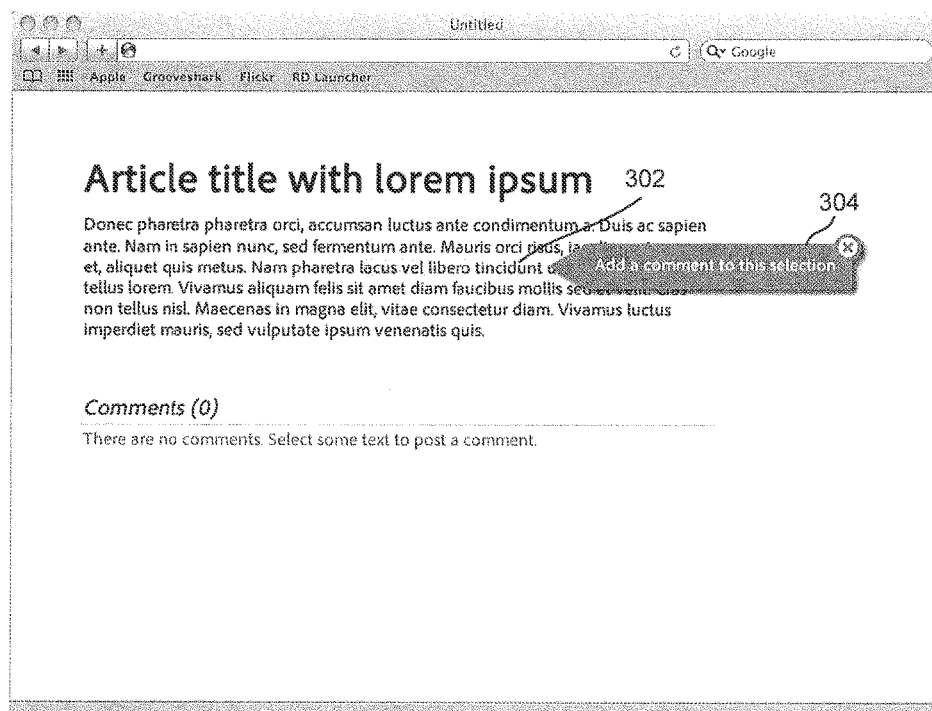
FIG. 3 is a screen shot diagram for providing contextual commenting on the web in accordance with some embodiments.

FIG. 3 is a screen shot diagram for providing contextual commenting on the web in accordance with some embodiments. As shown, a screen shot 300 of a browser displaying web content (e.g., a web page) that includes an article is provided. A contextual commenting widget allows a user to interact with the web content to make a content selection 302 (e.g., which can be indicated by a highlighting over the content selection or using some other indication mechanism, such as colored font, dashed underlining, or a rectangular or shaded box around the content selection). The contextual commenting widget then displays a message 304 that prompts a user to post a comment related to the content selection 302.

Figure 4:
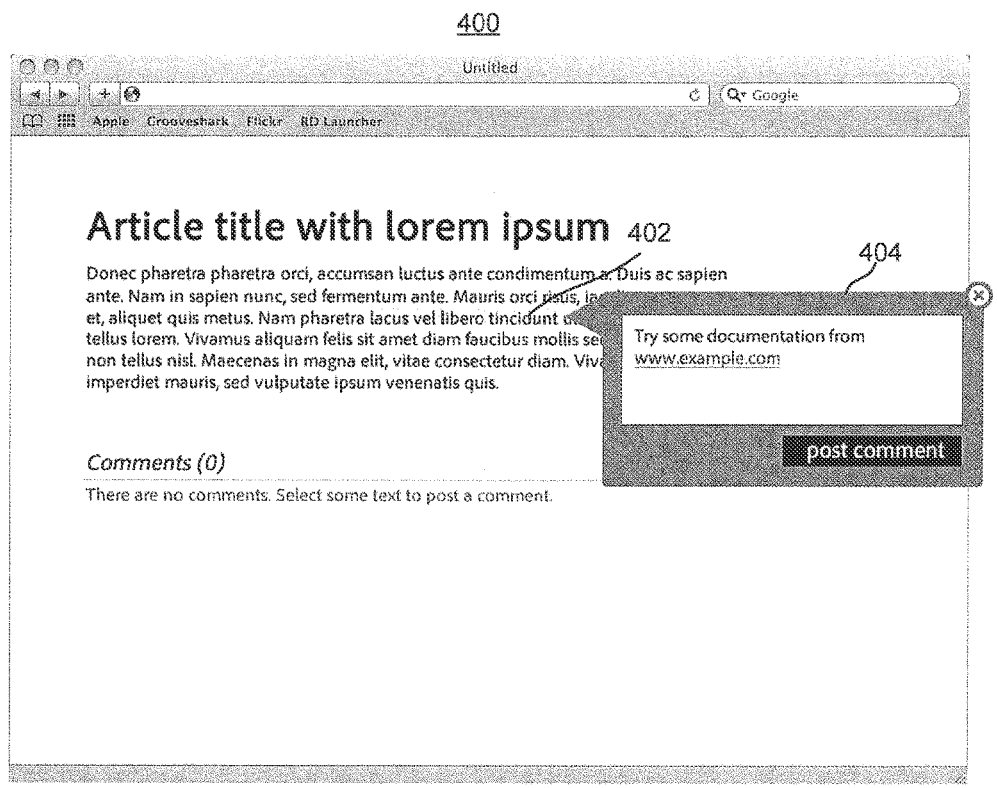
FIG. 4 is another screen shot diagram for providing contextual commenting on the web in accordance with some embodiments.

FIG. 4 is another screen shot diagram for providing contextual commenting on the web in accordance with some embodiments. As shown, a screen shot 400 of a browser displaying web content and indicating the content selection 402. The contextual commenting widget also displays a comment input window 404 for posting a comment related to the content selection 402. For example, a user can post a comment using the comment input window 404, close or dismiss the comment input window 404, and/or continue using the page with the default behavior. If the user chooses to post a comment, the contextual commenting widget presents the user with a text input method and "post" or "cancel" input controls.

Figure 5:
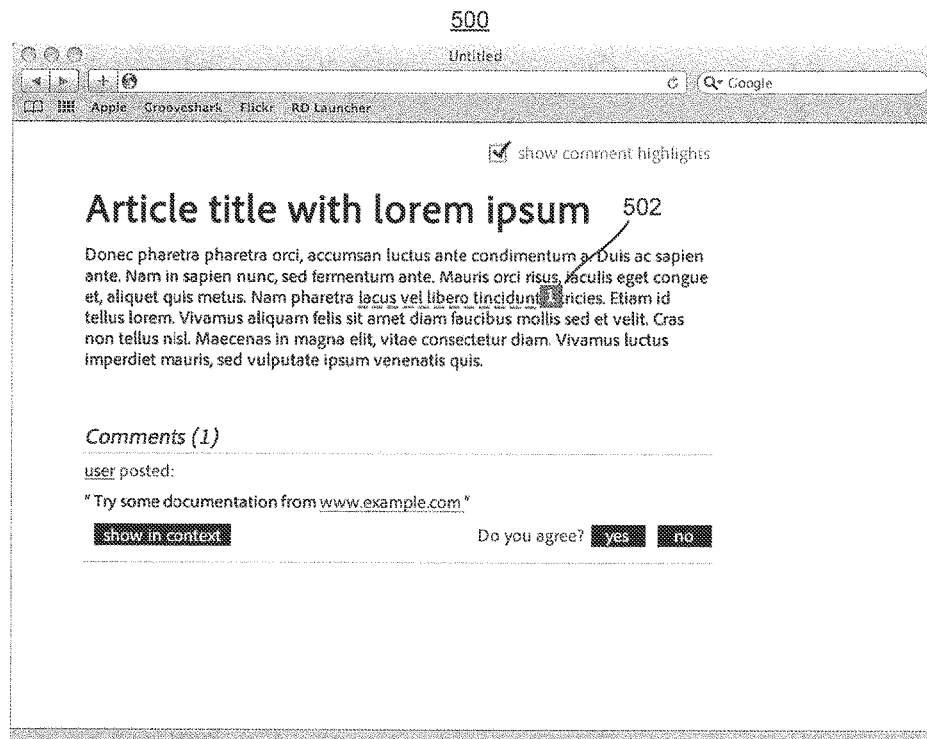
FIG. 5 is another screen shot diagram for providing contextual commenting on the web in accordance with some embodiments.

FIG. 5 is another screen shot diagram for providing contextual commenting on the web in accordance with some embodiments. As shown, a screen shot 500 of a browser displaying web content and indicating the content selection, indicated by a dashed underlining, and an associated visual indicator 502. The contextual commenting widget displays the visual indicator 502, which indicates a number "1" to indicate a number of contextual comments associated with this content selection. For example, a user can select (e.g., click or tap) on the visual indicator 502 to view the contextual comment(s).

Figure 6:
FIG. 6 is another screen shot diagram for providing contextual commenting on the web in accordance with some embodiments.

FIG. 6 is another screen shot diagram for providing contextual commenting on the web in accordance with some embodiments. As shown, a screen shot 600 of a browser displaying web content and indicating the content selection, indicated by a shaded box over the content selection of text, and an associated posted comment(s) window 602. The contextual commenting widget displays a posted comment in the context of the displayed web page in comment window 602 indicated in association with a content selection, which includes input controls that allow a user to reply to the posted comment as well as a community/social rating option that allows other users to vote "yes" or "no" as to whether or not the user agrees with the displayed posted comment. The contextual commenting widget also displays a classic list of comments 604 in which posted comments are listed at a footer of the web page, which also similarly includes voting input controls for user input regarding the comment posted in 604. In this example, only one contextual comment is posted, but in other cases, there can be multiple contextual comments displayed in associated with a given content selection of web content.

Figure 7:
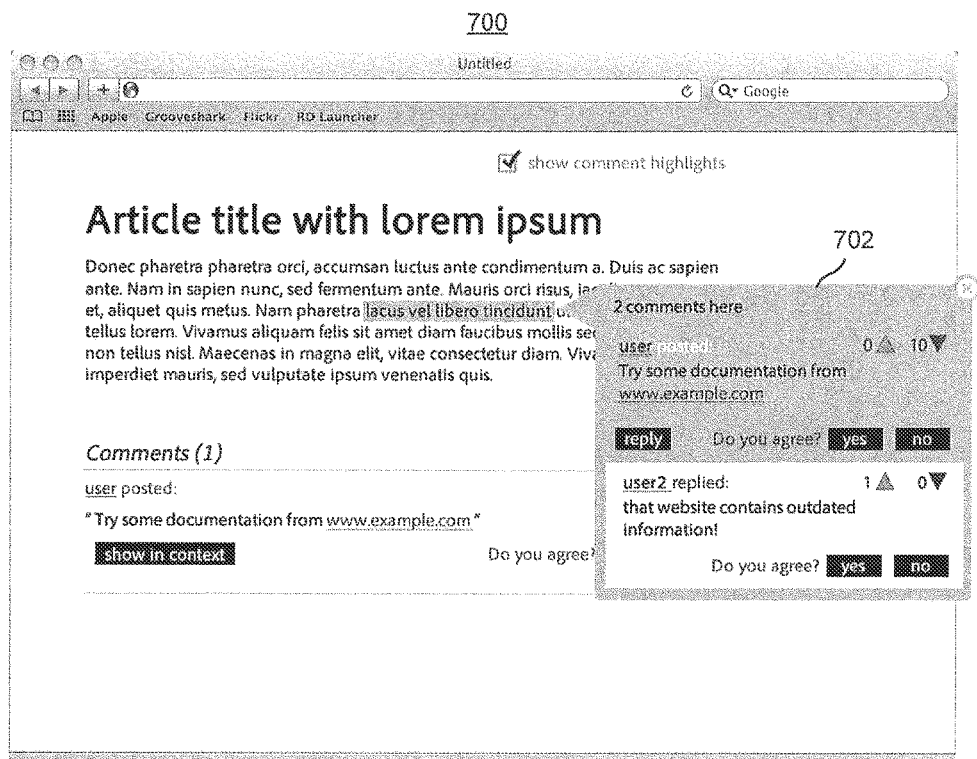
FIG. 7 is another screen shot diagram for providing contextual commenting on the web in accordance with some embodiments.

FIG. 7 is another screen shot diagram for providing contextual commenting on the web in accordance with some embodiments. As shown, a screen shot 700 of a browser displaying web content and indicating the content selection, indicated by a shaded box over the content selection of text, and an associated posted comment(s) window 702. The contextual commenting widget displays a posted comment in the context of the displayed web page in comment window 702 indicated in association with a content selection as well as a reply to that posted comment (e.g. a reply to the comment that was posted by a "user2"), in which each also include input controls that allow a user to reply to the posted comment as well as a community/social rating option that allows other users to vote "yes" or "no" as to whether or not the user agrees with the displayed posted comment. As also shown, each comment indicates a current rating or vote count by other users, and the first posted comment indicates no positive ratings/votes and "10" negative ratings/votes and the "user2" reply posted comment indicates "1" positive rating/vote and no negative ratings/votes.

Figure 8:
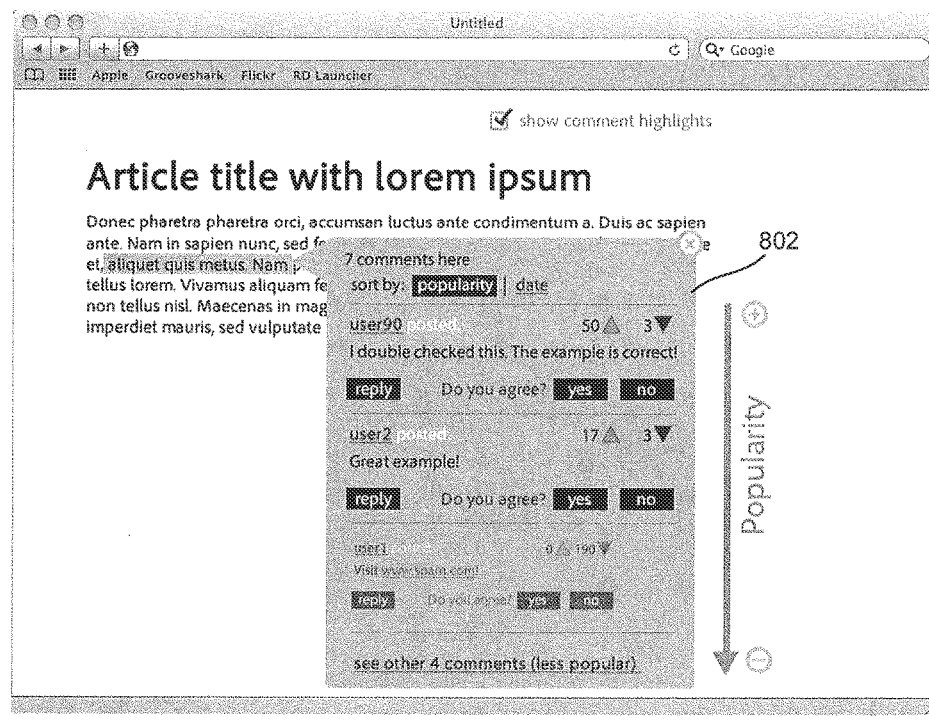
FIG. 8 is another screen shot diagram for providing contextual commenting on the web in accordance with some embodiments.

FIG. 8 is another screen shot diagram for providing contextual commenting on the web in accordance with some embodiments. As shown, a screen shot 800 of a browser displaying web content and indicating the content selection, indicated by a shaded box over the content selection of text, and an associated posted comment(s) window 802. The contextual commenting widget displays a list of the associated (7) contextual comments sorted by popularity based on community feedback (e.g., user ratings/voting input). Accordingly, based on ratings by other users, certain posted comments will appear more or less prominent in the posted comment(s) window 802 (e.g., comments that have negative community ratings are less prominent and hidden from view unless the viewer explicitly requests to see such comments, by for example, selecting "see other 4 comments (less popular)" link as shown). Thus, over time, as users post more comments on the same content selection or on overlapping portions of it, the contextual comments list can be sorted by user approval based on ratings.

Figure 9:
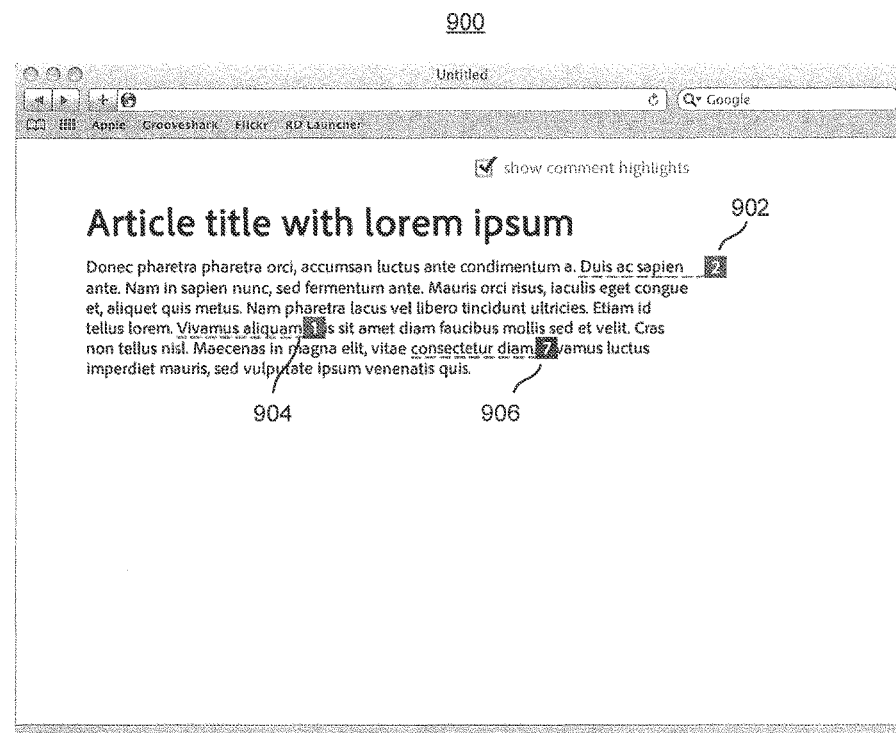
FIG. 9 is another screen shot diagram for providing contextual commenting on the web in accordance with some embodiments.

FIG. 9 is another screen shot diagram for providing contextual commenting on the web in accordance with some embodiments. As shown, a screen shot 900 of a browser displaying web content and indicating a first content selection, indicated by a dashed underlining, and an associated visual indicator 902, a second content selection, indicated by a dashed underlining, and an associated visual indicator 904, and a third content selection, indicated by a dashed underlining, and an associated visual indicator 906. The contextual commenting widget displays each visual indicator with a number as shown to indicate a number of contextual comments associated with each respective content selection. For example, a user can select (e.g., click or tap) on each visual indicator to view the associated contextual comments. In some embodiments, the number of comments and ratings on such comments also affects the visual indicator on the corresponding content selection (e.g., a visual indicator color, size, and/or other changes to the visual indicator can vary to more promptly display contextual comments that have a higher number of comments and/or highly rated/approved of comments). Accordingly, this approach draws attention to an area of the page that is of particular user/community interest.

Various techniques can be used to rank contextual comments based on a score. In some embodiments, a score is calculated by passing the ratings for a comment through to the following formula: $[(U-D)/(U+D]*\log(U+D)$ in which U=the number of "up" votes on a comment and D=the number of "down" votes on a comment. The first term $[(U-D)/(U+D)]$ measures the quality of the comment from the perspective of users' votes. The second term $\log(U+D)$ is used to differentiate between more or less active comment threads.

Figure 10:
FIG. 10 is another screen shot diagram for providing contextual commenting on the web in accordance with some embodiments.

FIG. 10 is another screen shot diagram for providing contextual commenting on the web in accordance with some embodiments. As shown, a screen shot 1000 of a browser displaying web content and indicating multiple visual indicators as similarly shown in FIG. 9. In this example, the contextual commenting widget also displays a classic list of comments 1002. In particular, comments for all content selections of the currently displayed web content are shown in this classic, out-of-context list of comments at 1002. For example, this classic list allows users to get an overview of feedback on the web content. In some embodiments, clicking a comment in the classic list will cause the contextual commenting widget to automatically relocate the browser view to the corresponding context, highlighting the associated content selection.

Figure 11:
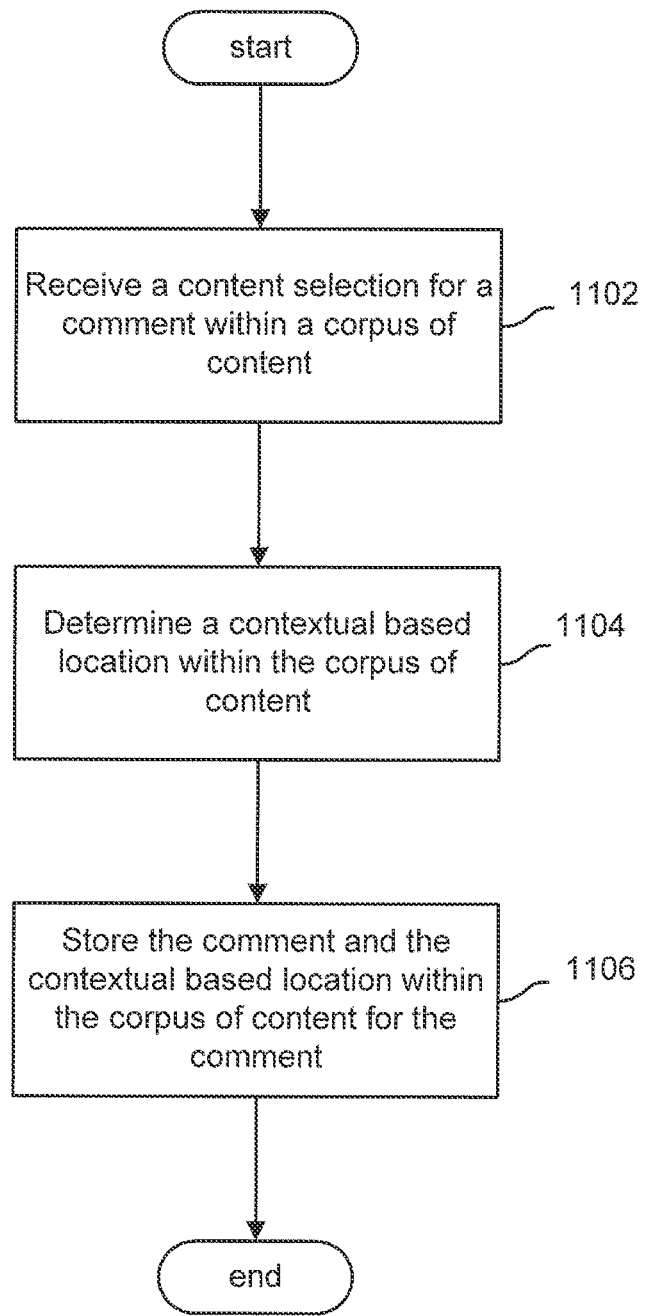
FIG. 11 is a flow diagram for providing contextual commenting on the web in accordance with some embodiments.

FIG. 11 is a flow diagram for providing contextual commenting on the web in accordance with some embodiments. At 1102, a content selection for a comment within a corpus of content (e.g., web content, such as a web page) is received. At 1104, a contextual based location within the corpus of content is determined. At 1106, the comment and the contextual based location within the corpus of content for the comment are stored.

Figure 12:
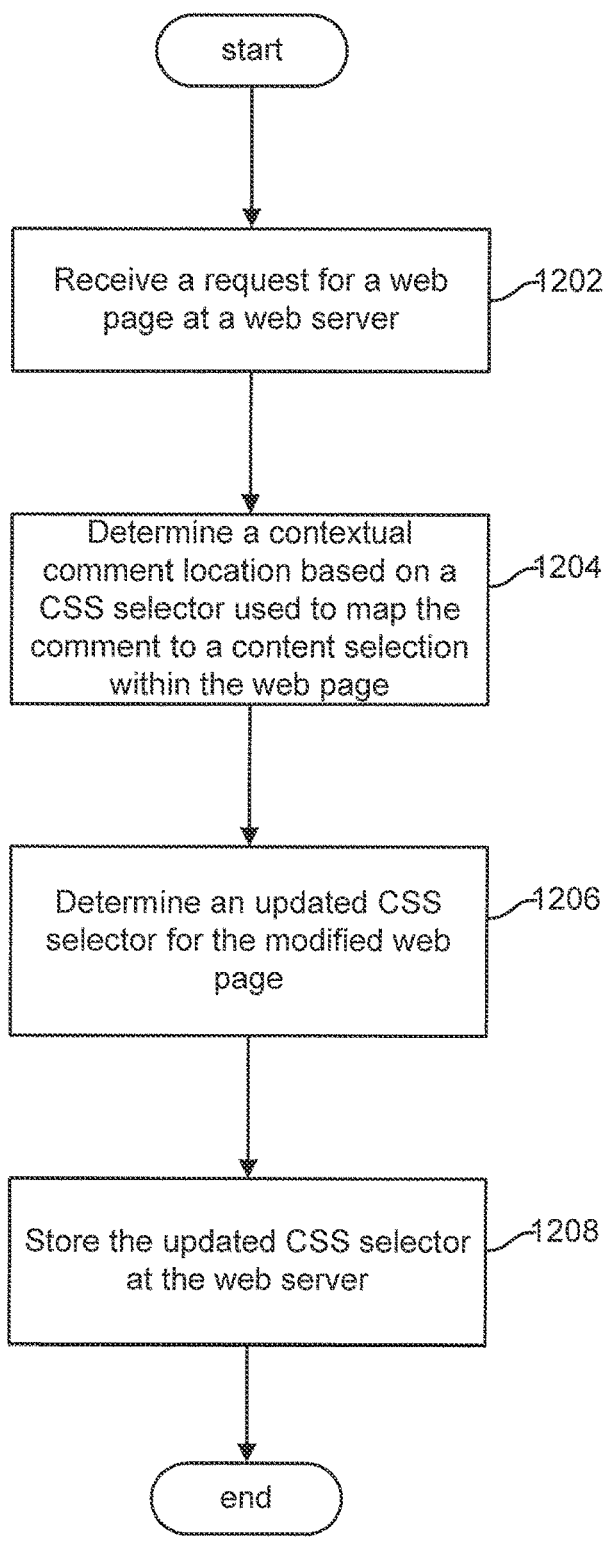
FIG. 12 is another flow diagram for providing contextual commenting on the web in accordance with some embodiments.

FIG. 12 is another flow diagram for providing contextual commenting on the web in accordance with some embodiments. At 1202, a request for a web page is received. At 1204, a contextual comment location is determined based on a CSS selector, which is used to map the comment to a content selection within the web page. At 1206, an updated CSS is determined for the modified web page. At 1208, the updated CSS selector is stored at the web server (e.g., a web service platform for providing the web page(s), contextual comment(s), and CSS selector(s)).

Figure 13:
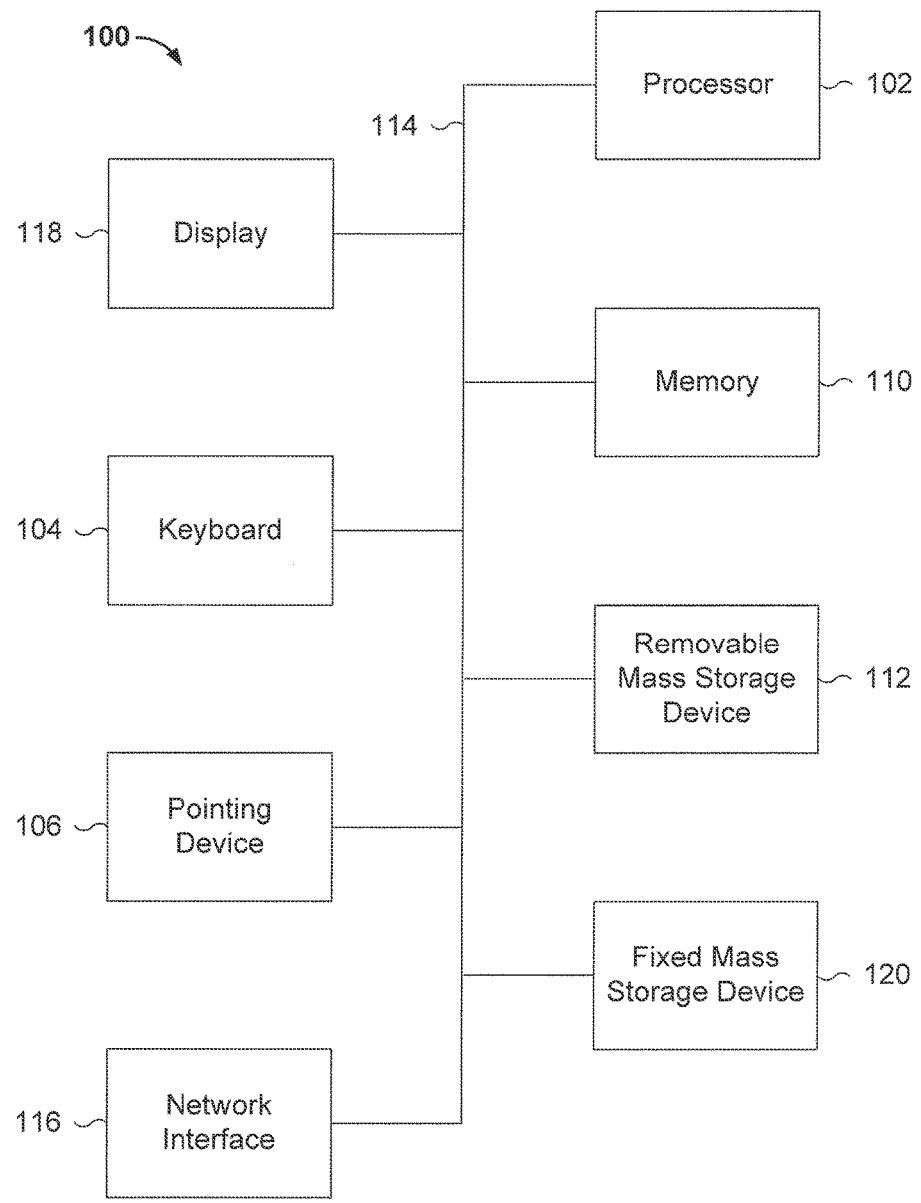
FIG. 13 is a functional diagram illustrating a programmed computer system for providing contextual commenting on the web in accordance with some embodiments.

FIG. 13 is a functional diagram illustrating a programmed computer system for providing contextual commenting on the web in accordance with some embodiments. As shown, FIG. 13 provides a functional diagram of a general purpose computer system programmed to perform providing contextual commenting on the web in accordance with some embodiments. As will be apparent, other computer system architectures and configurations can be used to perform context-sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the various computer/computer implemented functional elements and/or executes/performs the processes described below with respect to FIGS. 1 through 12.

Processor 102 is coupled bidirectionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable non-transitory computer readable storage media, described below, depending on whether, for example, data access needs to be bidirectional or unidirectional. For example, processor 102 can also directly and very rapidly retrieve and store frequently needed data in a cache memory (not shown).

A removable mass storage device 112 provides additional data storage capacity for the computer system 100, and is coupled either bidirectionally (read/write) or unidirectionally (read only) to processor 102. For example, storage 112 can also include computer-readable media such as magnetic tape, flash memory, PC cards, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems, as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection, as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch sensitive displays, transducer card readers, tape readers, voice or handwriting recognizers, biometric readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to: all the media mentioned above, magnetic media such as hard disks, floppy disks, and magnetic tape, optical media such as CD-ROM disks, magneto-optical media such as optical disks, and specially configured hardware devices, such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 13 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized (e.g., server devices, appliances with hardware configured for specific functions, such as a web server or an application server, and/or various other types of computing devices that can execute various operating systems and/or virtual machine software techniques).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory having instructions stored thereon that, if executed by the processor, cause the processor to:
      receive, from a web server, a web page and one or more contextual comments associated with the web page;
      map, by at least using a Cascading Style Sheet (CSS) selector available from the web server, the one or more contextual comments to one or more contextual comment locations within selected content of the web page, the selected content having been selected based on relevance of the selected content to the one or more contextual comments, wherein the CSS selector provides the mapping by at least indicating (i) an address that stores the selected content and a uniform resource locator of the web page and (ii) an address for the one or more contextual comments;
update a contextual comment location of the one or more contextual comment locations based on a modification to the selected content;
update the CSS selector at the web server based on the updated contextual comment location; and
display, based on the updated CSS selector, the web page visually indicating the one or more contextual comments as being associated with the modification to the selected content.

2. The system recited in claim 1, the memory having further instructions stored thereon that, if executed by the processor, cause the processor to:
receive contextual based location information associated with the one or more contextual comments.

3. The system recited in claim 1, the memory having further instructions stored thereon that, if executed by the processor, cause the processor to:
receive a first content selection for a first contextual comment, wherein a contextual comment location for the first contextual comment is determined by at least using the CSS selector to map the first contextual comment to the contextual comment location.

4. The system recited in claim 1, the memory having further instructions stored thereon that, if executed by the processor, cause the processor to:
determine the contextual comment location based on the CSS selector that maps the one or more contextual comments to the contextual comment location within the web page, wherein the web page has been modified; and
update the CSS selector based on the modification of the web page.

5. The system recited in claim 1, the memory having further instructions stored thereon that, if executed by the processor, cause the processor to:
determine the contextual comment location on the CSS selector that maps the one or more contextual comments to an associated content selection within the web page, wherein the web page has been modified;
update the CSS selector based on the modification of the web page; and
send an updated version of the CSS selector to the web server.

6. The system recited in claim 1, the memory having further instructions stored thereon that, if executed by the processor, cause the processor to:
receive a ranking input for at least one of the one or more contextual comments.

7. The system recited in claim 1, wherein the mapping of the CSS selector to the one or more contextual comment locations is based on an address of the CSS selector.

8. The system recited in claim 7, wherein the web page is displayed based on the address of the CSS selector.

9. A computer implemented method, comprising:
receiving, from a web server, a web page and one or more contextual comments associated with the web page;
mapping, by at least using a Cascading Style Sheet (CSS) selector available from the web server, the one or more contextual comments to one or more contextual comment locations within selected content of the web page, the mapping being based at least in part on relevance of the one or more contextual comments to the selected content, wherein the CSS selector provides the mapping by at least indicating (i) an address that stores the selected content and a uniform resource locator of the web page and (ii) an address for the one or more contextual comments;
updating a contextual comment location of the one or more contextual comment locations based on a modification to the selected content;
updating the CSS selector at the web server based on the updated contextual comment location; and
displaying the web page based on the updated CSS selector, the displaying including visually indicating the one or more contextual comments as being associated with the modification to the selected content.

10. The computer implemented method recited in claim 9, further comprising:
receiving contextual based location information associated with the one or more contextual comments.

11. The computer implemented method recited in claim 9, further comprising:
receiving a first content selection and a first contextual comment, wherein a contextual comment location of the first contextual comment is determined by at least using the CSS selector that maps the first contextual comment to the first content selection.

12. The computer implemented method recited in claim 9, further comprising:
determining a contextual comment location based at least in part on one or more Cascading Style Sheet (CSS) selectors that map the one or more contextual comments to an associated content selection within the web page, wherein the web page has been modified; and
updating the one or more CSS selectors.

13. The computer implemented method recited in claim 9, further comprising:
determining a contextual comment location based on the CSS selector that maps the one or more contextual comments to an associated content selection within the web page, wherein the web page has been modified;
updating the CSS selector based on the modification of the web page; and
sending an updated version of the CSS selector to the web server.

14. The computer implemented method recited in claim 9, further comprising:
receiving a ranking input for at least one of the one or more contextual comments.

15. A non-transitory computer-readable storage medium having instructions stored thereon that, if executed by a computing device, cause the computing device to perform operations comprising:
receiving, from a web server, a web page and one or more contextual comments associated with the web page;
mapping, by at least using a Cascading Style Sheet (CS S) selector available from the web server, the one or more contextual comments to one or more contextual comment locations within selected content of the web page, the mapping being based at least in part on relevance of the one or more contextual comments to the selected content, wherein the CSS selector provides the mapping by at least indicating (i) an address that stores the selected content and a uniform resource locator of the web page and (ii) an address for the one or more contextual comments;
updating a contextual comment location of the one or more contextual comment locations based on a modification to the selected content;

updating the CSS selector at the web server based on the updated contextual comment location; and displaying the web page based on the updated CSS selector, the displaying including visually indicating the one or more contextual comments as being associated with the modification to the selected content.

16. The computer-readable storage medium of claim 15, the instructions further comprising instructions that, if executed by the computing device, cause the computing device to perform operations comprising:

receiving contextual based location information associated with the one or more contextual comments.

17. The computer-readable storage medium of claim 15, the instructions further comprising instructions that, if executed by the computing device, cause the computing device to perform operations comprising:

receiving a first content selection and a first contextual comment, wherein a contextual comment location of the first contextual comment is determined by at least using the CSS selector that maps the first contextual comment to the first content selection.

18. The computer-readable storage medium of claim 15, the instructions further comprising instructions that, if executed by the computing device, cause the computing device to perform operations comprising:

determining the contextual comment location based on the CSS selector that maps the one or more contextual comments to an associated content selection within the web page, wherein the web page has been modified; and updating the CSS selector based on the modification of the web page.

19. The computer-readable storage medium of claim 15, the instructions further comprising instructions that, if executed by the computing device, cause the computing device to perform operations comprising:

determining the contextual comment location based on the CSS selector that maps the one or more contextual comments to an associated content selection within the web page, wherein the web page has been modified;

updating the CSS selector based on the modification of the web page; and sending an updated version of the CSS selector to the web server.

20. The computer-readable storage medium of claim 15, the instructions further comprising instructions that, if executed by the computing device, cause the computing device to perform operations comprising:

receiving a ranking input for at least one of the one or more contextual comments.

* * * * *